(12) United States Patent
Potter

(10) Patent No.: US 9,194,582 B2
(45) Date of Patent: Nov. 24, 2015

(54) ENERGY RECOVERY AND TRANSFER SYSTEM AND PROCESS

(75) Inventor: Patrick Potter, Hamilton (NZ)

(73) Assignee: Cake Energy, LLC, Mission Viejo, CA (US)

( * ) Notice: Subject to any disclaimer, the term of this patent is extended or adjusted under 35 U.S.C. 154(b) by 824 days.

(21) Appl. No.: 12/503,038

(22) Filed: Jul. 14, 2009

(65) Prior Publication Data
US 2010/0006013 A1 Jan. 14, 2010

Related U.S. Application Data

(60) Provisional application No. 61/080,466, filed on Jul. 14, 2008.

(51) Int. Cl.
*F23G 5/04* (2006.01)
*B02C 18/14* (2006.01)
(Continued)

(52) U.S. Cl.
CPC .. *F23G 5/04* (2013.01); *F23G 5/46* (2013.01); *F23K 1/04* (2013.01); *F26B 23/028* (2013.01); *F26B 25/005* (2013.01); *B02C 18/142* (2013.01); *F23G 2201/10* (2013.01); *F23G 2201/80* (2013.01); *F23G 2206/10* (2013.01); *F23G 2209/12* (2013.01); *F23G 2209/30* (2013.01);
(Continued)

(58) Field of Classification Search
CPC . F23K 1/00; F23K 2201/10; F23K 2201/101; F23K 2201/103; F23K 2201/1003; F23K 2201/1006; F23K 2201/20; F23G 5/033; F23G 5/04; F23G 2201/80; B02C 18/14; B02C 18/142; B02C 18/18; B02C 18/182

USPC ........ 110/215, 216, 224, 225, 226, 210, 211, 110/302, 304, 308, 342
See application file for complete search history.

(56) References Cited

U.S. PATENT DOCUMENTS 4,366,928 A * 1/1983 Hughes ........................... 241/30
4,487,139 A * 12/1984 Warner ......................... 110/345
(Continued)

FOREIGN PATENT DOCUMENTS

WO WO 2009/035346 A1 3/2009

OTHER PUBLICATIONS

International Search Report and Written Opinion for International application No. PCT/IB10/02031; dated Jun. 6, 2011; 8 pages.
(Continued)

*Primary Examiner* — David J Laux
(74) *Attorney, Agent, or Firm* — G. Brian Pingel; David M. Breiner

(57) ABSTRACT

A process for energy recovery and transfer including: warming fresh air in a heat recovery and pressure control unit; feeding waste feed and the warm fresh air into a processor; reducing a moisture content of the waste feed by breaking the waste feed into a fuel powder in the warm fresh air in the processor; filtering contaminated air through an initial filter to remove the fuel powder from the contaminated air; pre-heating the contaminated air in the heat recovery and pressure control unit; raising the temperature of the pre-heated contaminated air in a chamber; passing the chamber discharge air through the heat recovery and pressure control unit to pre-heat contaminated air passing on to the chamber and to warm fresh air passing on to the processor; and filtering terminal air through a terminal filter to remove particles from the terminal air.

26 Claims, 6 Drawing Sheets

(51) Int. Cl.
*F23K 1/04* (2006.01)
*F23G 5/46* (2006.01)
*F26B 23/02* (2006.01)
*F26B 25/00* (2006.01)

(52) U.S. Cl.
CPC ....... *F23K 2201/103* (2013.01); *F23K 2201/20* (2013.01)

(56) References Cited

U.S. PATENT DOCUMENTS

| | | | |
|---|---|---|---|
| 4,498,632 A * | 2/1985 | Ruter | 241/18 |
| 4,983,362 A * | 1/1991 | Obermuller | 431/115 |
| 5,639,035 A * | 6/1997 | Maugle et al. | 241/236 |
| 6,524,096 B2 * | 2/2003 | Pribish | 431/8 |
| 7,584,918 B1 * | 9/2009 | Briggs, Jr. et al. | 241/197 |
| 8,500,048 B2 * | 8/2013 | Potter | 241/23 |
| 2002/0020677 A1 | 2/2002 | Noll | |
| 2005/0211636 A1 | 9/2005 | Schien et al. | |
| 2006/0096163 A1 | 5/2006 | Dickinson et al. | |
| 2006/0265954 A1 | 11/2006 | Dogru et al. | |
| 2007/0170290 A1 | 7/2007 | Gali | |
| 2008/0311016 A1 | 12/2008 | Maekawa et al. | |

OTHER PUBLICATIONS

New Zealand Patent Application No. NZ 299036, published on Jan. 26, 1998, 20 pages.

* cited by examiner

ENERGY RECOVERY AND TRANSFER SYSTEM AND PROCESS

CROSS-REFERENCE TO RELATED APPLICATION(S)

This application claims priority to and the benefit of U.S. Provisional Patent Application No. 61/080,466, filed on Jul. 14, 2008, in the United States Patent and Trademark Office, the entire content of which is incorporated herein by reference. The entire content of United States Patent Applications PROCESS AND APPARATUS FOR DRYING AND POWDERIZING MATERIAL (application Ser. No. 12/503,044, now Pat. No. 8,500,048), HEAT RECOVERY AND PRESSURE CONTROL UNIT (application Ser. No. 12/503,030), and METHOD AND APPARATUS FOR STERILIZING AND DEODORIZING AIR (application Ser. No. 12/503,027) filed on Jul. 14, 2009 in the United States Patent and Trademark Office is incorporated herein by reference.

FIELD OF INVENTION

The present invention relates to a process and system for energy recovery and transfer.

BACKGROUND OF THE INVENTION

Animal byproduct meals, fecal material, agricultural fertilizer, corn byproducts, wheat byproducts, wood pulp, and the like are high moisture content materials that may provide a rich source of energy when effectively dehydrated. Further, some of this waste feed should be sterilized and deodorized before being discharged into the environment.

Therefore, there is a need for a process and system for energy recovery and transfer from these materials.

SUMMARY OF THE INVENTION

An embodiment of the present invention provides a system for energy recovery and transfer. The system includes a processor, an initial filter, a terminal filter, a heat recovery and pressure control unit, and a chamber. The heat recovery and pressure control unit is adapted to receive fresh air and warm the fresh air. The processor is adapted to receive the warm fresh air from the heat recovery and pressure control unit and a waste feed, and is adapted to reduce a moisture content of the waste feed by breaking the waste feed into a fuel powder in the warm fresh air. The initial filter is adapted to receive contaminated air and fuel powder from the processor, and is adapted to remove the fuel powder from the contaminated air. The heat recovery and pressure control unit is adapted to receive the filtered contaminated air from the initial filter, and is adapted to pre-heat the contaminated air. The chamber is adapted to receive the pre-heated contaminated air from the heat recovery and pressure control unit, and is adapted to raise the temperature of the pre-heated contaminated air. The heat recovery and pressure control unit is adapted to receive the chamber discharge air and utilize the chamber discharge air to preheat air passing on to the chamber and warm fresh air passing on to the processor so that the temperature of the chamber discharge air is lowered. The terminal filter is adapted to receive terminal air from the heat recovery and pressure control unit, and is adapted to remove particles from the terminal air.

The temperature of the air may be above dew point after the fresh air is warmed in the heat recovery and pressure control unit. The system may further include a terminal gas cleaner and condensate energy recovery module, wherein the terminal gas cleaner and condensate energy recovery module is adapted to receive terminal air from the terminal filter and remove water vapor from the terminal air. The terminal gas cleaner and condensate energy recovery module may include water-cooled coils adapted to reduce the temperature of the terminal air below dew point.

The chamber may include a combuster, wherein the combuster is adapted to generate heat by combusting the fuel powder to raise the temperature of the pre-heated contaminated air in the chamber. Heat generated from combusting an alternative fuel may raise the temperature of the pre-heated contaminated air in the chamber until fuel powder is filtered from the warm air and transported to the combuster.

The moisture content of the fuel powder may be less than about 5%. The waste feed may include sewage solids with moisture content ranging from about 70% to about 80% by weight.

The system may be managed by a central processing unit to maintain continuous operation. The system may further include sterilization and deodorization of the pre-heated contaminated air in the chamber.

Another embodiment of the present invention provides a process for energy recovery and transfer. The process includes: warming fresh air in a heat recovery and pressure control unit; feeding waste feed and the warm fresh air into a processor; reducing a moisture content of the waste feed by breaking the waste feed into a fuel powder in the warm fresh air in the processor; filtering contaminated air through an initial filter to remove the fuel powder from the contaminated air; pre-heating the contaminated air in the heat recovery and pressure control unit; raising the temperature of the pre-heated contaminated air in a chamber; passing the chamber discharge air through the heat recovery and pressure control unit to pre-heat contaminated air passing on to the chamber and to warm fresh air passing on to the processor by lowering the temperature of the chamber air; and filtering terminal air through a terminal filter to remove particles from the terminal air.

The temperature of the air may be above dew point after the warming fresh air in the heat recovery and pressure control unit. The process may further include removing water vapor from the terminal air in a terminal gas cleaner and condensate energy recovery module. The terminal air may pass through water-cooled coils in the terminal gas cleaner and condensate energy recovery module to reduce the temperature of the terminal air below dew point.

The chamber may include a combuster adapted to combust fuel powder, wherein the combusting of fuel powder generates heat to raise the temperature of the pre-heated contaminated air in the chamber. Heat generated from combusting an alternative fuel may raise the temperature of the pre-heated contaminated air in the chamber until fuel powder is filtered from the warm air and transported to the chamber.

The moisture content of the fuel powder may be less than about 5%. The waste feed may include sewage solids with moisture content ranging from about 70% to about 80% by weight.

The process may be managed by a central processing unit to maintain continuous operation. The process may further include sterilization and deodorization of the pre-heated contaminated air in the chamber.

DETAILED DESCRIPTION OF THE INVENTION

The detailed description set forth below in connection with the drawings is intended as a description of embodiments of a system and process for energy recovery and transfer provided in accordance with the present invention and is not intended to represent the only forms in which the invention may be constructed or utilized. It is to be understood that the same or equivalent functions and structures may be accomplished by different embodiments that are also intended to be encompassed within the spirit and scope of the invention. As denoted elsewhere herein, like element numbers indicate like elements or features.

Some biological or organic waste feed materials, such as animal meal and sewage, are a rich source of energy when they are in a dry state. However, animal meal contains a high level of moisture. Further, sewage is transported in water and this water must be removed by pressing the sewage, and the solids that remain after the pressing still contain about 70% to about 80% moisture and about 20% solids by weight. Corn byproducts, wheat byproducts, and wood pulp are other examples of waste feed materials that are a good source of energy but generally contain too much moisture to be useable as fuel in their raw state. These waste feed materials (or raw fuel) must be dried to about 5% moisture to be a high grade fuel. A large quantity of high temperature air is required to evaporate the moisture from the waste feed, and the air may become contaminated with odors and pathogens from the waste feed.

A process for converting the moisture-laden waste feed into dry fuel powder according to an embodiment of the present invention includes: breaking the waste feed into fuel powder in the presence of warm fresh air in a processor, heating the contaminated air to sterilize and deodorize the air, and recapturing heat utilized to warm the fresh air entering the processor.

Figure 1:
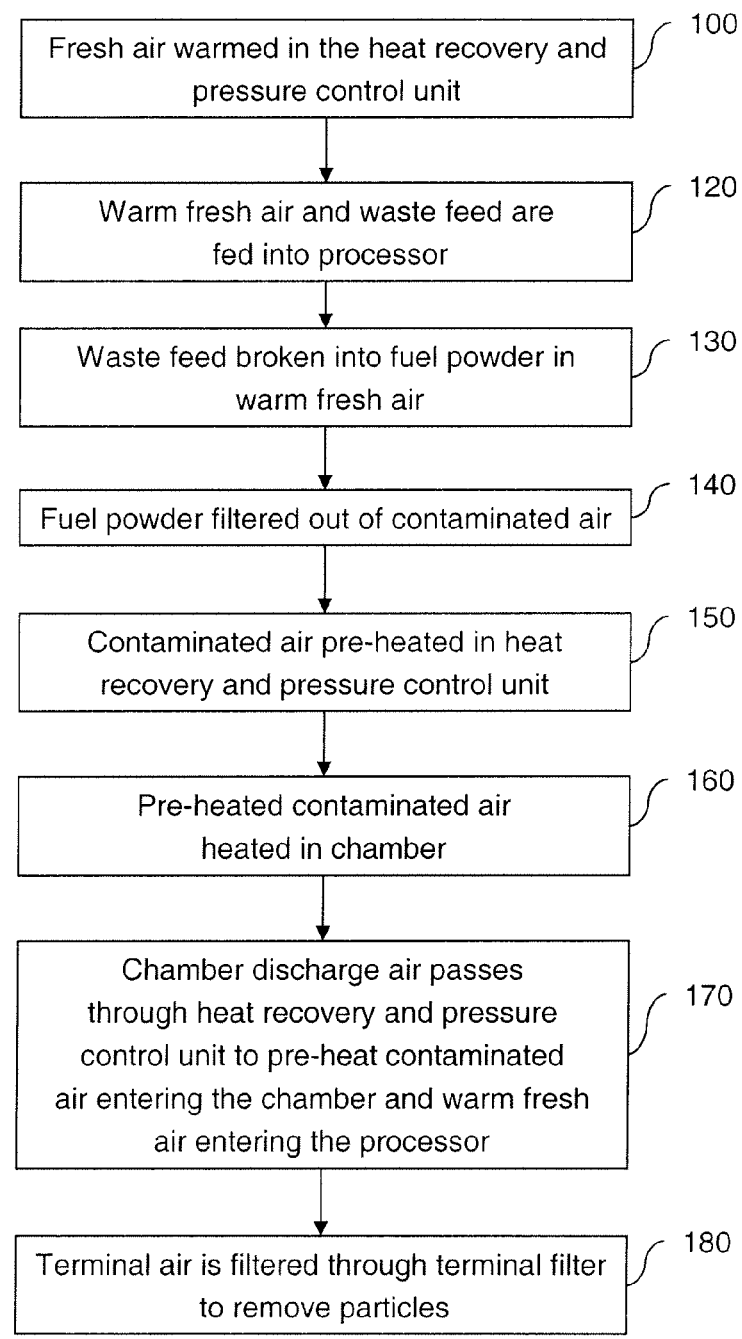
FIG. 1 is a flow chart of a process for energy recovery and transfer according to an embodiment of the present invention.

As shown in FIG. 1, fresh air from the atmosphere is warmed in a heat recovery and pressure control unit 100. For example, the fresh air may be warmed to a temperature of about 600 degrees C. for waste feed such as sewage.

The warm fresh air and the waste feed are fed into a processor 120. Here, the waste feed is broken into a fuel powder in the presence of the warm fresh air 130 so that moisture in the waste feed quickly evaporates into the warm fresh air. For example, the waste feed may be broken into a powder with a consistency resembling talcum powder. However, the warm air in the processor may contain contaminants from the waste feed, such as pathogens and the like, and would then need to be contained away from other air utilized in the process and from escaping to the atmosphere.

The fuel powder is filtered out of the contaminated air 140 using a filter, and the filtered fuel powder has a moisture content of about 5%. The fuel powder may then be transferred to a combuster to be combusted to heat air utilized in this process. The contaminated air is transferred from the filter back to the heat recovery and pressure control unit, where the contaminated air is pre-heated 150.

The pre-heated contaminated air is transferred to a chamber, such as a retention chamber or a detoxification chamber, where the temperature of the pre-heated contaminated air is raised 160. For example, the temperature of the contaminated air in the chamber may be raised to about 800 degrees C. to sterilize and deodorize the air. The pre-heated contaminated air may also remain in the chamber for a time period sufficient to achieve sterilization and deodorization of the pre-heated contaminated air, e.g., a time in a range of about one to about two seconds, and then discharged from the chamber.

The chamber discharge air is then passed back through the heat recovery and pressure control unit to pre-heat contaminated air entering the chamber and to warm fresh air entering the processor 170. Here, energy is recovered by transferring heat from the chamber discharge air to air passing through other parts of the process. However, since the chamber discharge air has been sterilized and deodorized, the chamber discharge air must be kept separated from the other air. Since heat is transferred from the chamber discharge air, the temperature of the chamber discharge air is lowered before passing on to a terminal filter.

Terminal air is then passed from the heat recovery and pressure control unit through a terminal filter to remove any remaining particles from the terminal air 180. At this point in the process, the terminal air from the terminal filter may be safely released into the atmosphere.

Figure 2:
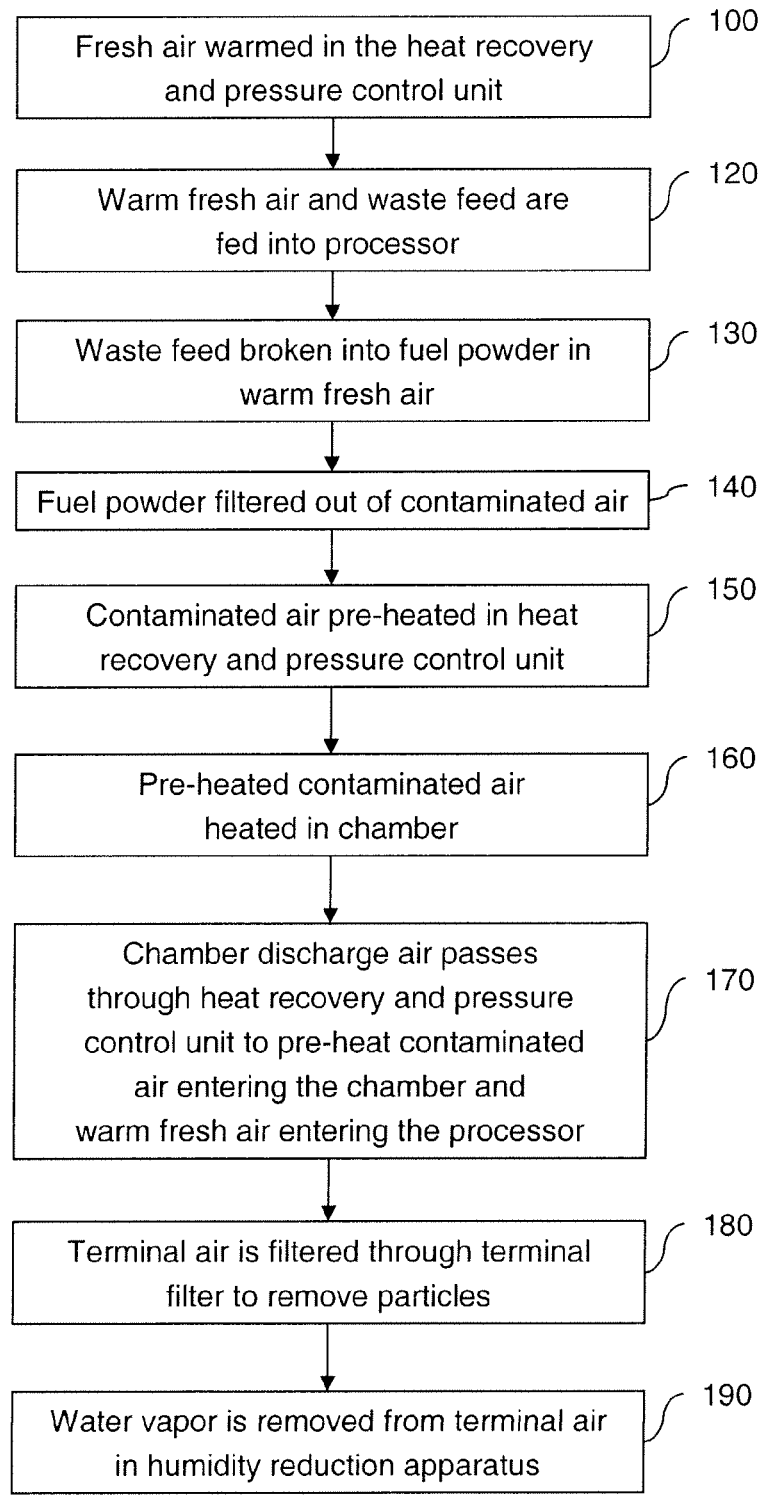
FIG. 2 is a flow chart of a process for energy recovery and transfer according to another embodiment of the present invention.

However, in an embodiment of the present invention shown in FIG. 2, the terminal air from the terminal filter is sent to a terminal gas cleaner and condensate energy recovery module to have water vapor removed from the terminal air 190. Here, the water is removed from the terminal air that has been sterilized in the chamber, so the water may be utilized for some productive use, such as irrigation or the like.

Though numerous suitable methods of removing water vapor are commonly known to those of ordinary skill in the art, in an embodiment of the present invention, water vapor may be removed from the terminal air in the terminal gas cleaner and condensate energy recovery module, for example, by passing the terminal air through water-cooled coils. Here, the temperature of the terminal air is lowered below dew point, e.g., about 60 degrees C. to about 65 degrees C., so that water vapor in the terminal air condenses and falls to the bottom of the terminal gas cleaner and condensate energy recovery module, where the water is removed from the apparatus.

In an embodiment of the present invention, water entering the coils of the terminal gas cleaner and condensate energy recovery module 42 is about 20 degrees C., and water exiting the coils of the terminal gas cleaner and condensate energy recovery module 42 has been warmed to about 84 degrees C. because heat from the terminal air has been conducted to the water. Here, the heated water from the coils may be utilized for other purposes, such as pre-heating or the like.

Figure 6:
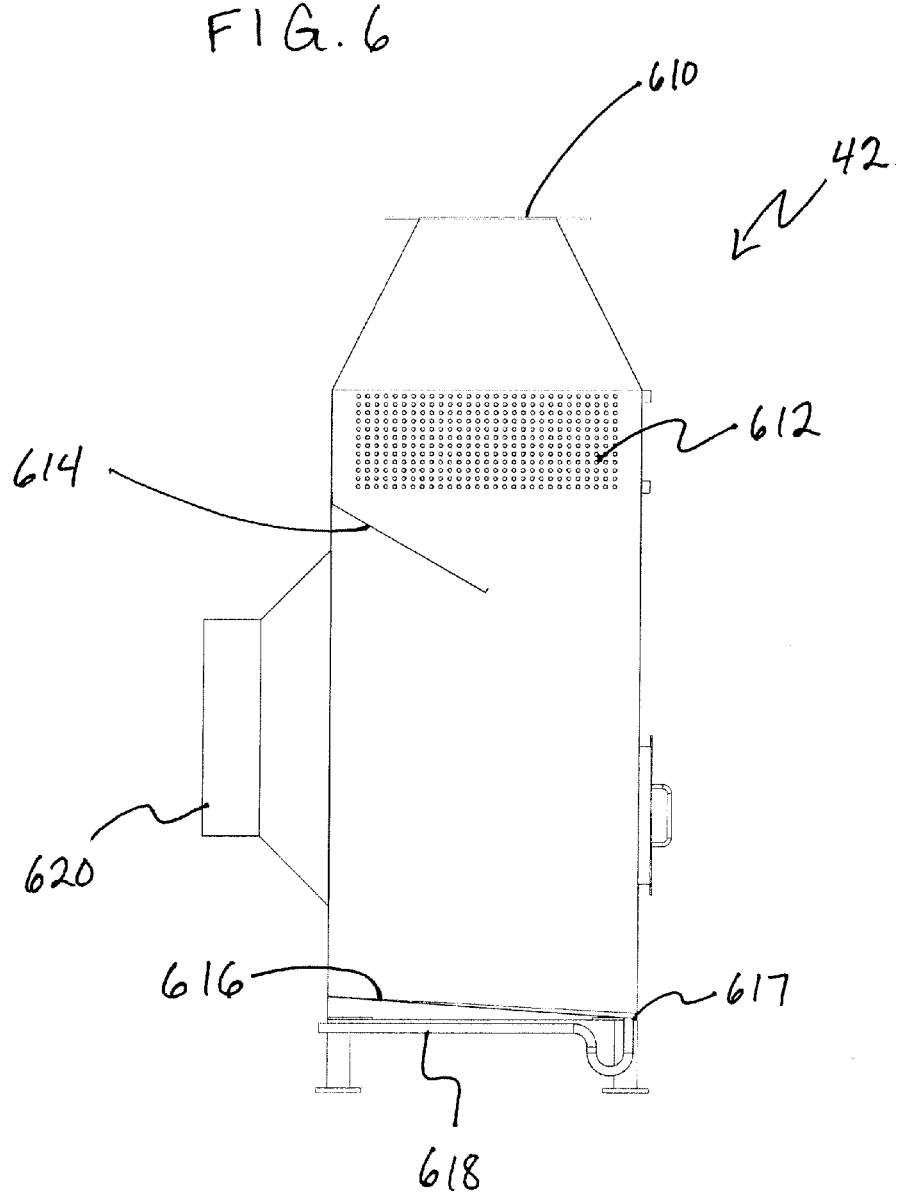
FIG. 6 is a cross-sectional view of a terminal gas cleaner and condensate energy recovery module according to an embodiment of the present invention.

In an embodiment of the present invention shown in FIG. 6, terminal air enters the terminal gas cleaner and condensate energy recovery module 42 through an inlet 610. The terminal air then passes over and through water-cooled coils 612. Water vapor that condenses on the coils 612 falls to an angled floor 616. An angled baffle 614 moves falling water away from an outlet 620 where the terminal air exits the terminal gas cleaner and condensate energy recovery module 42 and towards the lower end of the angled floor 616. Water flows down the angled floor 616 toward a drain 617 and then flows out of the system through a conduit 618.

Figure 3:
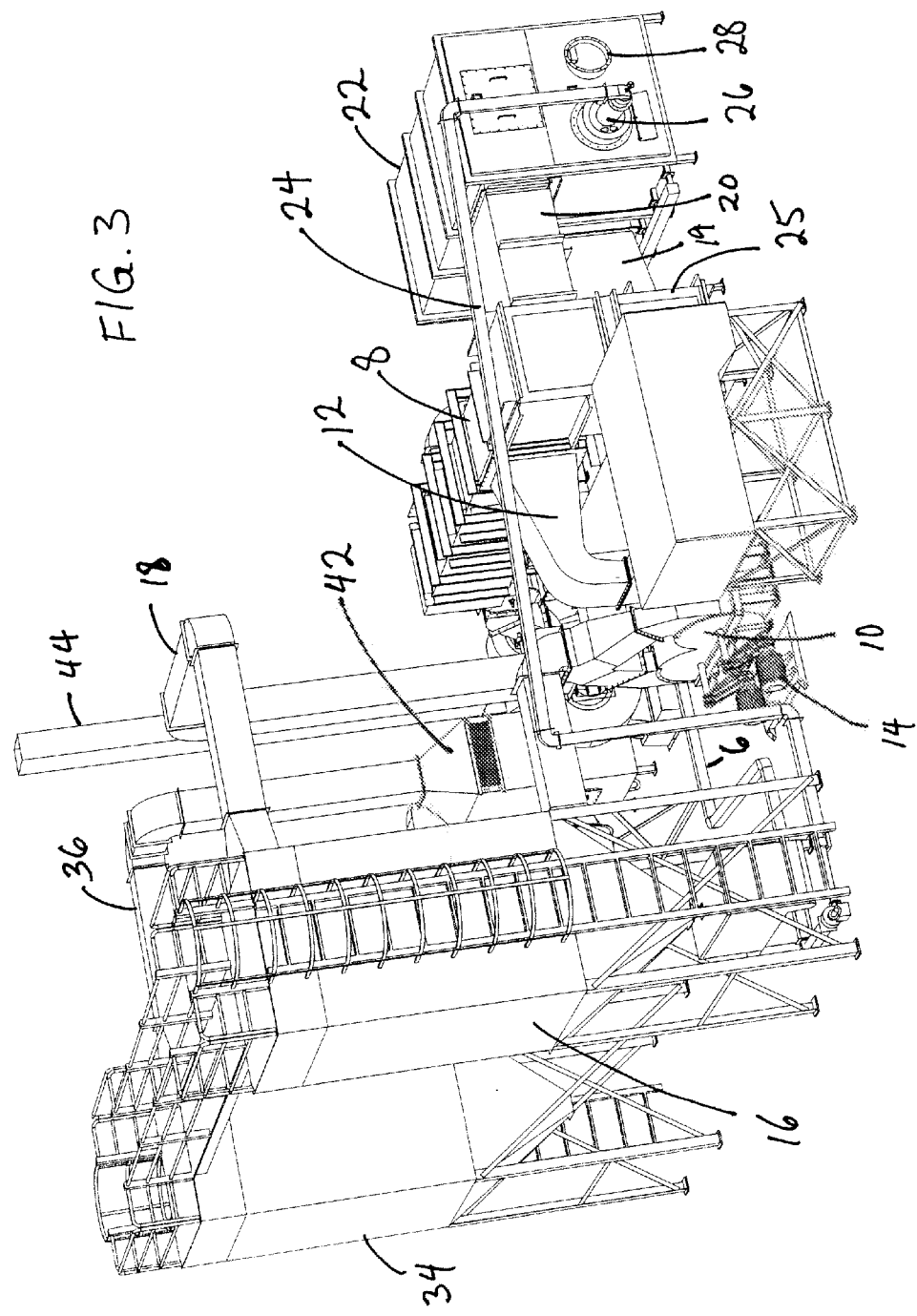
FIG. 3 is a perspective view of a system for energy recovery and transfer according to an embodiment of the present invention.
Figure 4:
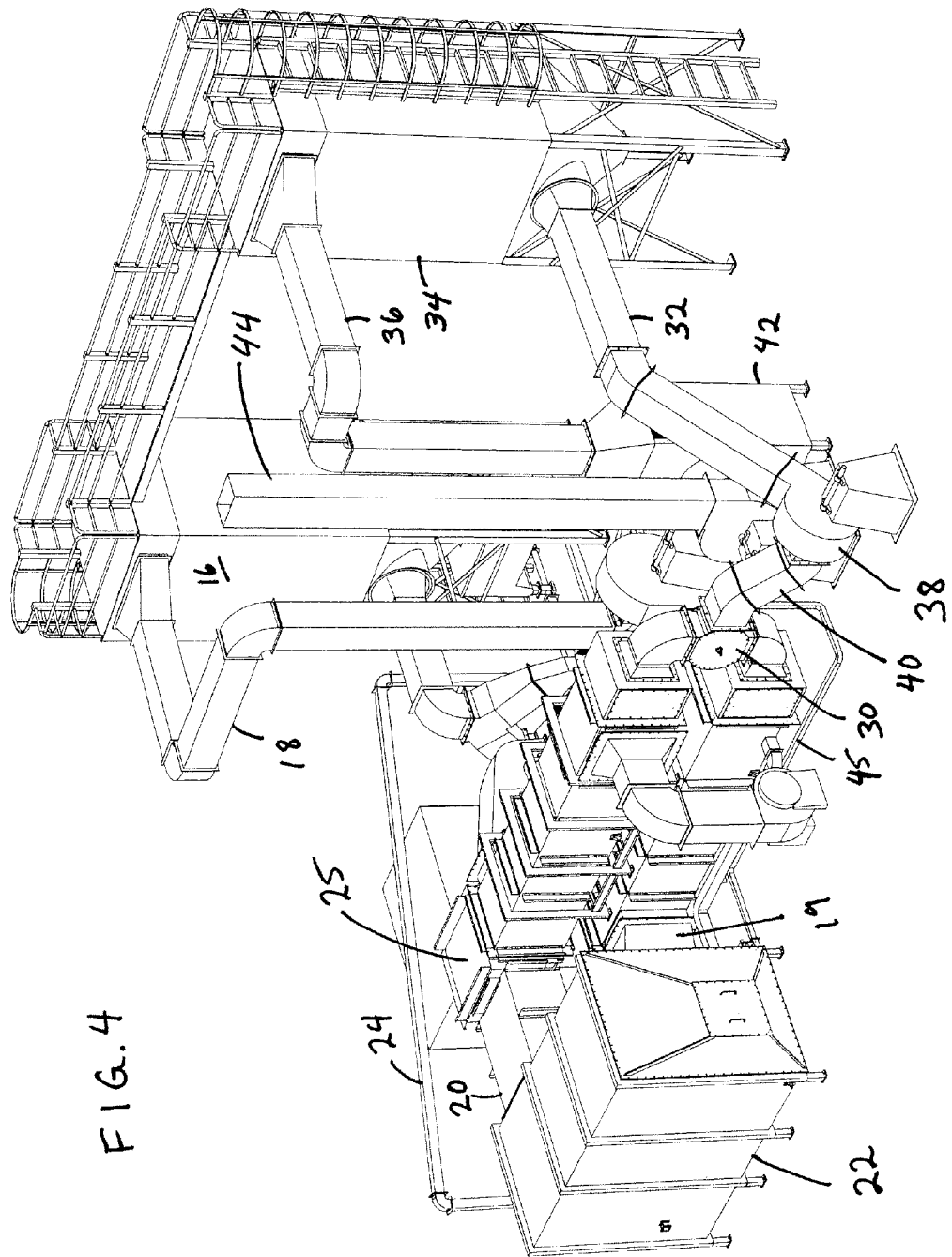
FIG. 4 is another perspective view of a system for energy recovery and transfer according to an embodiment of the present invention.

A system according to an embodiment of the present invention is shown in FIGS. 3 and 4. Here, fresh air is warmed in the heat recovery and pressure control unit 8 before it travels through a warm fresh air conduit 12 to a processor 10. Further, waste feed also enters the processor 10.

Figure 5:
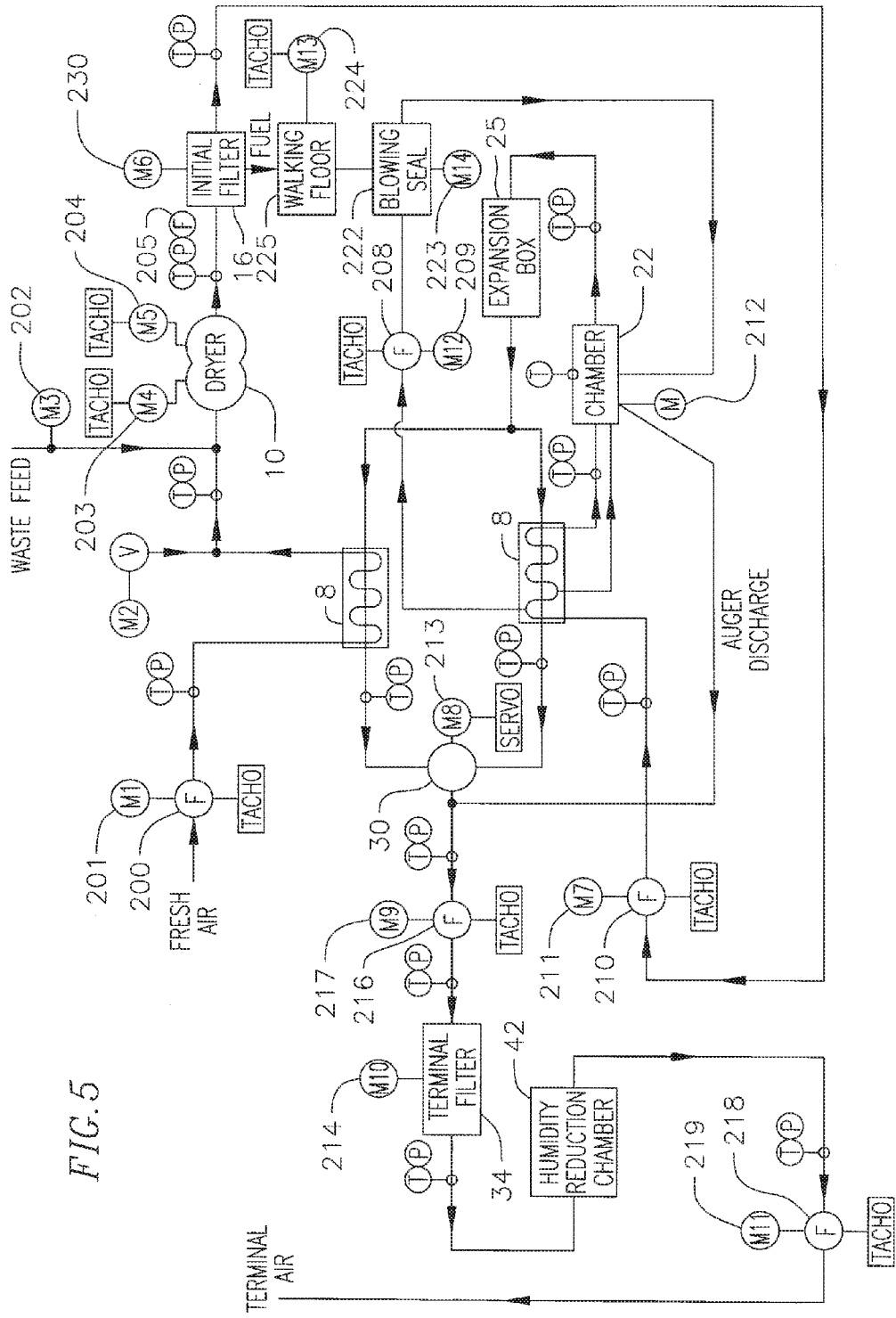
FIG. 5 is a schematic view of a system and process for energy recovery and transfer according to another embodiment of the present invention.

In another embodiment of the present invention as shown in FIG. 5, fresh air from the atmosphere is pulled into the system with a fresh air fan 200 driven by a motor 201. Here, the fresh air has a temperature of about 21 degrees C. or a temperature of the ambient air and a pressure of about 12 "wg (inches of water gauge). The fresh air is then warmed to about 600 degrees C. in the heat recovery and pressure control unit 8 before the warm fresh air passes into the processor 10. For example, the warm fresh air may pass into the processor 10 at a rate of about 6000 cubic feet per minute to about 11,000 cubic feet per minute, or any other suitable flow rate to process and/or dry the volume of waste feed material passing through the processor 10.

In an embodiment of the present invention, shutdown purge valve 220 opens and vents fresh cool air into the system if the temperature increases beyond a desired temperature, e.g., 20 degrees above the desired temperature.

Also shown in the embodiment of the present invention shown in FIG. 5, waste feed is fed into the processor 10 with a center-less auger driven by an auger motor 202. For example, if the warm fresh air passes into the processor 10 at a rate of about 6000 cubic feet per minute to about 11,000 cubic feet per minute, the waste feed may be fed into the processor 10 at about 9 cubic feet per minute to about 12 cubic feet per minute. However, a person of ordinary skill in the art will appreciate that the processor 10 may be optimized for different desired volumes of waste feed material and/or rates of processing waste feed material, and a suitable volume and/or rate of warm fresh air will be utilized for the processing of the waste feed material.

In the processor 10, the moist waste feed is broken into small particles, such as a fuel powder that resembles talcum powder. For example, the particles of the fuel powder may be a size where about 80% of the particles will be smaller than 76 microns (or 200 mesh). This breaking of the waste feed takes place in the presence of the warm fresh air, and the processor 10 further mixes the fuel powder in the warm fresh air. The moisture in the waste feed evaporates into the warm fresh air as the waste feed is broken into fuel powder. In an embodiment of the present invention, fuel powder leaving the processor 10 has about 5% moisture.

In an embodiment of the present invention, rotating blades inside the processor 10 break the waste feed into small particles of fuel powder, mix the fuel powder with the warm fresh air, move the fuel powder through the processor 10, and move the fuel powder out of the processor 10.

In an embodiment of the present invention shown in FIG. 5, the rotating blades are driven by motors 203 and 204. Here, for example, the surface area of the powdered fuel may be about 3000 times the surface area of the waste feed as it enters the processor 10, and the waste feed may be in the processor for about 15 seconds. Also, the temperature of the contaminated air exiting the processor 10 may be about 120 degrees C. and the pressure may be about 6 "−wg.

In an embodiment of the present invention, speed of waste feed delivery by the center-less auger may be decreased if a blockage is detected, e.g., motors 203 and 204 drawing too much current, or increased if the temperature of the fuel powder leaving the processor 10 is too high.

The fuel powder and contaminated air is then passed through an initial filter 16 to remove the fuel powder from the contaminated air. In embodiments of the present invention, the initial filter 16 may be a bag type filter, an electrostatic precipitator, or other suitable filter, which removes about 99% of the fuel powder from the contaminated air. For example, the bag filter may be a Donaldson Torit Baghouse Collector, or any other suitable or equivalent filter.

Here, the bag filter is positioned in the line of air flow to allow contaminated air to pass through the bag filter, but prevent the fuel powder from passing through the bag filter. The fuel powder falls to the bottom of the initial filter 16, where the fuel powder is moved out of the initial filter 16. For example, the fuel powder may be moved out of the initial filter by a rotary valve 230.

In an embodiment of the present invention shown in FIG. 5, a fan 210 moves the fuel powder and contaminated air mixture through the initial filter 16. The fuel powder that is filtered from the contaminated air may be removed from the system, or the fuel powder may move through a fuel conduit 24 to a combuster 26 to be combusted to heat air in the system, which will be discussed below in greater detail.

In an embodiment of the present invention shown in FIG. 5, a flame suppression system 205 (e.g., a Fike flame suppression system) detects and chemically suppresses potential explosions at an early stage so that damage to the system is prevented or reduced.

In an embodiment of the present invention as shown in FIG. 5, contaminated air siphoned from the heat recovery and pressure control unit 8 is blown by a fan 208, driven by a motor 209, through the air conduit 6, shown in FIG. 4, to pick up the powdered fuel metered through a rotary blowing seal valve 222 to convey the fuel in the air stream through the fuel conduit 24 to the chamber 22.

The contaminated air moves through a contaminated air conduit 18 to the heat recovery and pressure control unit 8. Here, the contaminated air is pre-heated. However, since the contaminated air may contain particles from the waste feed, the contaminated air is contained away from other air traveling through the system.

In an embodiment of the present invention shown in FIG. 5, the fan 210, driven by a motor 211, blows contaminated air from the initial filter 16 into the heat recovery and pressure control unit 8 with a pressure of 9-11 "+wg. Some of this air is siphoned off for use in a clean-in-place blower in the chamber 22, which is explained in greater detail below.

In an embodiment of the present invention shown in FIG. 5, contaminated air exiting the heat recovery and pressure control unit 8 has been pre-heated to a temperature of about 450 degrees C. to about 500 degrees C., with a pressure of about 0 "−wg.

In an embodiment of the present invention, the pre-heated contaminated air is passed through conduit 19 into a chamber 22, such as a retention chamber or a detoxification chamber. Here, the temperature of the contaminated air is raised to a sufficiently high temperature to sterilize and deodorize the air. At this time, remaining residue from the waste feed or fuel powder may be combusted and these particles may fall to the bottom of the chamber 22.

For example, in the embodiment of the present invention shown in FIG. 5, the temperature of the pre-heated contaminated air may be raised to about 800 degrees C. with a pressure of about 1 "wg before being discharged from the chamber 22.

In an embodiment of the present invention, fuel powder from the fuel powder conduit 24 is combusted in a fuel powder combuster 26, such as a fuel injector or other suitable combuster, to heat the pre-heated contaminated air in the chamber 22. A byproduct of the combusting of the fuel powder may be sand that falls to the bottom of the chamber 22. In an embodiment of the present invention, the fuel powder combusts at about 1100 degrees C. In another embodiment of the present invention, power may be generated from the powdered fuel.

In another embodiment of the present invention, a temperature gauge is used to measure the chamber temperature of the combusting fuel powder.

However, at an initial start up of the process, fuel powder has not yet been generated. Therefore, in an embodiment of the present invention, another fuel, such as liquid natural gas or another suitable fuel, can be combusted in another combuster 28 to heat the pre-heated contaminated air in the chamber 22 until fuel powder arrives through the fuel powder conduit 24 to the fuel powder combuster 26.

In an embodiment of the present invention, the temperature of the air in the chamber 22 is controlled by the rate of powdered fuel fed to the burner. A rise of temperature will decrease the rate of feed and a decrease of temperature will increase the rate of feed. If the temperature rises above about 860 degrees the burner shuts off and the plant goes into an automatic shutdown sequence.

In an embodiment of the present invention shown in FIG. 5, a walking floor auger 225, powered by a motor 224, and a blowing seal 222, powered by a motor 223 control the flow of powdered fuel to the combuster 26.

In an embodiment of the present invention, the chamber 22 may have a system for removal of combusted particles, such as a clean-in-place system where the air feed from the heat recovery and pressure control unit 8 is utilized to blow the combusted particles to an edge of the chamber 22 for removal from the chamber 22. For example, the combusted particles may be removed from the chamber by an auger powered by an auger motor 212 and carried through conduit 45 to enter conduit 32 after the proportioning valve 30 and prior to fan 38.

The chamber discharge air from the chamber 22 travels through a conduit 20 to an expansion box 25, where the chamber discharge air passes into the heat recovery and pressure control unit 8. Since the chamber discharge air has been sterilized and deodorized, the chamber discharge air is contained away from the fresh air passing through the heat recovery and pressure control unit 8 to be warmed prior to entering the processor 10 and the contaminated air passing through the heat recovery and pressure control unit 8 to be pre-heated prior to entering the chamber 22. However, heat from the chamber discharge air is conducted to the fresh air to be warmed and the contaminated air to be pre-heated, thus conserving energy.

In an embodiment of the present invention, the pressure of the chamber discharge air, in the heat recovery and pressure control unit 8 is controlled with a proportioning valve 30, so that the temperatures of the fresh air to be warmed and the contaminated air to be pre-heated are maintained at within suitable ranges for the operation of the system.

In the embodiment of the present invention shown in FIG. 5, a motor 213 controls the proportioning valve 30.

Because heat from the chamber discharge air is conducted to the fresh air to be warmed and the contaminated air to be pre-heated, the temperature of the chamber discharge air is lowered before passing on to a terminal filter 34. For example, as shown in the embodiment of the present invention shown in FIG. 5, terminal air exiting the heat recovery and pressure control unit 8 may have a temperature of about 120 degrees C. and a pressure of about 15"–wg.

The terminal air passes through a terminal air conduit 32 to the terminal filter 34. Here, the terminal air is filtered to remove any remaining particulate matter prior to the terminal air being released to the atmosphere. For example, the terminal filter 34 may be a bag filter, such as the bag filter described above with respect to the initial filter 16.

In an embodiment of the present invention shown in FIG. 5, particles filtered from the terminal air are removed from the filter through motor 214. The particles that are filtered from the air are basically sand. Sand may be removed from the system for use in other applications, such as landscaping, glass manufacturing, or the like. Terminal air exiting the terminal filter 34 may have a temperature of about 120 degrees C. and a pressure of about 18"–wg.

For example, the composition of the sand has been experimentally found to be as follows:

| | |
|---|---|
| $SiO_2$ | 61.4% |
| $Al_2O_3$ | 14.1% |
| $Fe_2O_3$ | 5.5% |
| $CaO$ | 4.1% |
| $MgO$ | 1.7% |
| $Na_2O$ | 3.4% |
| $K_2O$ | 1.7% |
| $TiO_2$ | 1.0% |
| $Mn_3O_4$ | 0.10% |
| $SO_3$ | 0.30% |
| $P_2O_5$ | 4.10% |

In an embodiment of the present invention, a fan 216, driven by a motor 217, pushes the terminal air through the terminal filter 34.

In an embodiment of the present invention, the terminal air from the terminal filter 34 is passed through a terminal gas cleaner and condensate energy recovery module 42 prior to being passed on to the atmosphere. Here, water vapor is removed from the terminal air. For example, the water vapor may be removed from the terminal air by passing the terminal air through water-cooled coils, as described above.

In an embodiment of the present invention shown in FIG. 5, terminal air entering the terminal gas cleaner and condensate energy recovery module 42 may have a temperature of about 120 degrees C. and a pressure of about ½ "+wg. Once water vapor is removed from the terminal air in the terminal gas cleaner and condensate energy recovery module 42, the air may have a temperature of about 40 degrees C. and a pressure of about 2 "+wg.

In an embodiment of the present invention, the removed water vapor may contain contaminants, such as sulphur and arsenic. However, the concentrations of these contaminants may be low.

In an embodiment of the present invention, a fan 218, driven by a motor 219, pulls the terminal air through the terminal gas cleaner and condensate energy recovery module 42.

In an embodiment of the present invention, the coils are finned tubing.

The terminal air may then be passed out to the atmosphere through exit conduit 44. In an embodiment of the present invention, the terminal air released to the atmosphere at the end of the process is about 40% by weight of the original moisture content of the waste feed material.

Further, a control system, such as a central processing unit or computer, may be utilized to control and monitor the system. For example, the control system may be utilized to control the proportioning valve 30 based on air temperature and pressure readings between the elements of the system. Further, the control system may also be utilized to control the rate at which powdered fuel is combusted in the powdered fuel combuster 26.

Monitoring the system to determine the pressure and temperature of the air between elements of the system provides information that may be utilized to control the system. The pressure and temperature of the air should be controlled so that suitable air flow and pressure are maintained throughout the system. Suitable air flow and pressure allows for suitable heat transfer in the heat recovery and pressure control unit 8, suitable drying of the waste feed in the processor 10, and suitable deodorization and sterilization in the chamber 22. In an embodiment of the present invention, the pressure and temperature throughout the system may be controlled by adjusting the proportioning valve 30, which controls the rate of air flow and air pressure through the heat recovery and pressure control unit 8.

In an embodiment of the present invention, all of the thermal energy supplied to the system will come from the combusting of fuel to heat the air in the chamber 22. Therefore, only powder fuel generated by the system is needed to heat the system, except for the alternative fuel that is needed to raise the system to operating temperature at initial start up and until enough powder fuel is generated to continue the thermal process for continual operation.

In an embodiment of the present invention as shown in FIG. 5, the temperature and pressure may be monitored at numerous and different points of the system and process, some of which are noted by "T" in a circle (for temperature) and "P" in a circle (for pressure).

In an embodiment of the present invention, each rotating motor has a tachometer, so that a stoppage of any of these motors will be detected and the system can be shutdown.

Although the present invention has been described through the use of exemplary embodiments, it will be appreciated by those of skill in the art that various modifications may be made to the described embodiments that fall within the scope and spirit of the invention as defined by the claims and their equivalents appended hereto. For example, aspects shown above with particular embodiments may be combined with or incorporated into other embodiments. Further, relative positions of the elements of the system may be adjusted or reordered.

What is claimed is:

1. A process for energy recovery and transfer, the process comprising:
    warming fresh air in a heat recovery and pressure control unit;
    feeding waste feed and the warm fresh air into a processor;
    reducing a moisture content of the waste feed by providing the waste feed between rotating blade assemblies of the processor to break the waste feed into a fuel powder in the warm fresh air, at least one of the blade assemblies including a plurality of blades being supported by a first shaft and another of the blade assemblies including a plurality of blades supported by a second shaft, the first and second shafts being substantially parallel and offset from one another;
    filtering contaminated air through an initial filter to remove the fuel powder from the contaminated air;
    pre-heating the contaminated air in the heat recovery and pressure control unit using contained heat exchange;
    raising the temperature of the pre-heated contaminated air in a chamber through fuel combustion;
    passing chamber discharge air from the chamber to an expansion box;
    passing the chamber discharge air from the expansion box to the heat recovery and pressure control unit;
    passing the chamber discharge air through the heat recovery and pressure control unit using contained heat exchange to pre-heat contaminated air passing on to the chamber and to warm fresh air passing on to the processor by lowering the temperature of the chamber discharge air;
    filtering terminal air through a terminal filter to remove particles from the terminal air, wherein a proportioning valve is adjustable to control the pressure of the chamber discharge air in the heat recovery and pressure control unit; and controlling the distribution and pressure of the chamber discharge air in the heat recovery and pressure control unit with a proportioning valve in a conduit, the proportioning valve being controlled based on at least the fresh air temperature and/or the contaminated air temperature.

2. The process of claim 1, wherein the temperature of the fresh air is above dew point after the warming fresh air in the heat recovery and pressure control unit.

3. The process of claim 1, further comprising removing water vapor from the terminal air in a terminal gas cleaner and condensate energy recovery module.

4. The process of claim 3, wherein the terminal air passes through water-cooled coils in the terminal gas cleaner and condensate energy recovery module to reduce the temperature of the terminal air below dew point.

5. The process of claim 1, wherein the chamber comprises a combuster adapted to combust fuel powder, wherein the combusting of fuel powder generates heat to raise the temperature of the pre-heated contaminated air in the chamber.

6. The process of claim 1, wherein heat generated from combusting an alternative fuel raises the temperature of the pre-heated contaminated air in the chamber.

7. The process of claim 1, wherein the moisture content of the fuel powder is less than about 5%.

8. The process of claim 1, wherein the waste feed comprises sewage solids with moisture content ranging from about 70% to about 80% by weight.

9. The process of claim 1, wherein the process is managed by a central processing unit to maintain continuous operation.

10. The process of claim 1, further comprising sterilization and deodorization of the terminal air in the chamber.

11. The process of claim 1, wherein the initial filter is a bag type filter or an electrostatic precipitator.

12. A system for energy recovery and transfer, the system comprising:
    a processor;
    an initial filter;
    a terminal filter;
    a heat recovery and pressure control unit;
    a chamber; a proportioning valve in a conduit; and
    an expansion box between the chamber and the heat recovery and pressure control unit, wherein
        the heat recovery and pressure control unit is configured to receive fresh air and warm the fresh air,
        the processor is configured to receive the warm fresh air from the heat recovery and pressure control unit and a waste feed, the processor including
            a first blade configured to revolve about a first axis;
            a second blade configured to revolve about a second axis, the first axis and the second axis being substantially parallel to one another and offset from one another, a material intake configured to receive the waste feed and provide the waste feed between the first axis and the second axis, the first and second blades being further configured to increase surface area of the waste feed to accelerate evaporation of liquid in the waste feed and break the waste feed into a powder so that the waste feed leaves the processor in powder form, the initial filter is configured to receive contaminated air comprising vaporized liquid gas and the powder from the processor and remove the powder from the contaminated air, the heat recovery and pressure control unit is configured to receive the contaminated air from the initial filter and use heat from the chamber to pre-heat the contaminated air, the chamber is configured to receive the pre-heated contaminated air from the heat recovery and pressure control unit and use fuel combustion to raise the temperature of the pre-heated contaminated air, the expansion box is configured to receive chamber discharge air from the chamber and provide the chamber discharge air to the heat recovery and pressure control unit;

the heat recovery and pressure control unit receives chamber discharge air and utilizes the chamber discharge air to preheat the contaminated air passing on to the chamber and to warm fresh air passing on to the processor the terminal filter is configured to receive chamber discharge air from the heat recovery and pressure control unit and remove particles from the chamber discharge air; and the proportioning valve controls the distribution and pressure of the chamber discharge air in the heat recovery and pressure control unit, the proportioning valve being controlled based on at least the fresh air temperature and/or the contaminated air temperature.

13. The system of claim 12, wherein the temperature of the fresh air is above dew point after the fresh air is warmed in the heat recovery and pressure control unit.

14. The system of claim 12, further comprising a terminal gas cleaner and condensate energy recovery module, wherein the terminal gas cleaner and condensate energy recovery module is adapted to receive terminal air from the terminal filter and remove water vapor from the terminal air.

15. The system of claim 14, wherein the terminal gas cleaner and condensate energy recovery module comprises water-cooled coils adapted to reduce the temperature of the terminal air below dew point.

16. The system of claim 12, wherein the chamber comprises a combuster, wherein the combuster is adapted to generate heat by combusting the fuel powder to raise the temperature of the pre-heated contaminated air in the chamber.

17. The system of claim 12, wherein heat generated from combusting an alternative fuel raises the temperature of the pre-heated contaminated air in the chamber.

18. The system of claim 12, wherein the moisture content of the fuel powder is less than about 5%.

19. The system of claim 12, wherein the waste feed comprises sewage solids with moisture content ranging from about 70% to about 80% by weight.

20. The system of claim 12, wherein the system is managed by a central processing unit to maintain continuous operation.

21. The system of claim 12, further comprising sterilization and deodorization of the pre-heated contaminated air in the chamber.

22. The system of claim 12, wherein the initial filter is a bag type filter or an electrostatic precipitator.

23. The system of claim 12, further comprising:

a fan configured to receive the contaminated air from the heat recovery and pressure control unit and move the fuel powder to the chamber.

24. The system of claim 23, further comprising:

a fan between the proportioning valve and the terminal filter.

25. The system of claim 12, wherein the blades are rotating blades arranged inside the processor.

26. The system of claim 25, wherein the rotating blades are configured to move the fuel powder through and out of the processor.

* * * * *